(12) United States Patent
Itai et al.

(10) Patent No.: US 6,890,585 B2
(45) Date of Patent: May 10, 2005

(54) METHOD OF MANUFACTURING MAGNETIC RECORDING MEDIUM AND THE MAGNETIC RECORDING MEDIUM

(75) Inventors: Yuichiro Itai, Kawasaki (JP); Yoshiharu Kasamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 218 days.

(21) Appl. No.: 09/943,787

(22) Filed: Aug. 31, 2001

(65) Prior Publication Data

US 2002/0043332 A1 Apr. 18, 2002

Related U.S. Application Data

(63) Continuation of application No. PCT/JP94/03363, filed on Jun. 24, 1999.

(51) Int. Cl.$^7$ ............................. G11B 5/725; G11B 5/84
(52) U.S. Cl. ........................................ 427/130; 427/558
(58) Field of Search .................................. 427/130, 558

(56) References Cited

U.S. PATENT DOCUMENTS

| 4,087,582 | A | * | 5/1978 | Shirahata et al. | ............ | 428/333 |
| 4,446,193 | A | * | 5/1984 | Afzali-Ardakani et al. | . | 428/422 |
| 4,619,865 | A | * | 10/1986 | Keem et al. | ................ | 428/333 |
| 4,761,316 | A | * | 8/1988 | Ogawa | ........................ | 428/65.5 |
| 4,992,300 | A | | 2/1991 | Ogawa et al. | | |
| 5,120,603 | A | * | 6/1992 | Schmidt | ...................... | 428/336 |
| 5,468,552 | A | * | 11/1995 | Ohnuki et al. | .............. | 428/336 |
| 6,410,103 | B1 | * | 6/2002 | Kasamatsu et al. | ......... | 427/553 |

FOREIGN PATENT DOCUMENTS

| JP | 60-223030 | 11/1985 |
| JP | 63-175225 | 7/1988 |
| JP | 1-296429 | 11/1989 |
| JP | 4-214221 | 8/1992 |
| JP | 4-319526 | 11/1992 |
| JP | 09-052707 | 2/1997 |

* cited by examiner

Primary Examiner—Stevan A. Resan
(74) Attorney, Agent, or Firm—Greer, Burns & Crain, Ltd.

(57) ABSTRACT

A method of manufacturing a magnetic recording medium which includes a bonding sub-layer substantially and forms a lubricant layer having a width. A method of manufacturing a magnetic recording medium includes the steps of: a) laminating an underlayer, a magnetic layer for recording, and a protection layer of amorphous carbon on a substrate of the magnetic layer for recording medium in turn, and b) repeating a process to the protection layer of amorphous carbon comprising an application process of applying a lubricant, a subsequent ultraviolet rays treatment process, and a subsequent washing process for removing the lubricant which is not connected to the protection layer of amorphous carbon, the process being repeated plural times.

6 Claims, 6 Drawing Sheets

METHOD OF MANUFACTURING MAGNETIC RECORDING MEDIUM AND THE MAGNETIC RECORDING MEDIUM

This is a continuation of International application No. PCT/JP99/03363, filed Jun. 24,1999.

BACKGROUND OF THE INVENTION

1. Field of the Invention

The present invention relates to a method of manufacturing a recording medium and the recording medium for use in a magnetic recording and reproduction device such as a hard disk drives serving as a secondary storage device of computers.

2. Description of the Related Art

In recent years, there has been an increasing need for high-density recording in magnetic storage devices such as hard disk drives. In such hard disk drives for high-density recording, it is necessary to reduce the magnetic spacing, which is a space formed between a magnetic head provided in the magnetic disk drives and the surface of a magnetic disk serving as a recording medium in the main body of the hard disk drives, as much as possible. In other words, the gap between the magnetic head and the magnetic disk surface, scanned by the magnetic head, should be as small as possible.

FIG. 1 is a schematic diagram showing a magnetic disk drive 100 including a magnetic head 120 and a rotatable magnetic disk 110 of the related art. FIG. 1 is illustrated in an enlarged view; so as to clearly show the layered structure of the magnetic disk 110 and magnetic spring S.

Referring to FIG. 1, the magnetic disk has a multilayered structure including a substrate 111, an underlayer 113 formed on the substrate 111, and a magnetic layer 115 formed on the underlayer 113. A protection layer 117 of amorphous carbon is provided on the magnetic layer 115.

The magnetic disk drive 100 described above generally operates in accordance with the so-called contact-start-stop (CSS) mode. With the CSS mode, a lift surface 120a of the magnetic head 120 contacts and slides over the surface of the magnetic disk 110 at the start or stop phase of rotation of the magnetic disk 110. The magnetic disk 110 has a CSS area within its surface. The magnetic head 120 contacts the CSS area when the magnetic disk 110 starts and stops rotating. On the other hand, the magnetic head 120 can float in the air with airflow caused by the rotation of the magnetic disk 110 when the magnetic disk drive 100 operates.

However, even during steady state operation, the magnetic head 120 may come into contact with the surface of the magnetic disk 110 due to unexpected affairs. To accommodate the continuous contact between the head 120 and the disk 110 when the drive starts or stops and the intermittent contact between the head 120 and the disk 110 when the head collides with unexpected affairs, the surface of the magnetic disk 110 should have both a low coefficient of friction and a high resistance to abrasion.

The magnetic disk 110 has a lubrication layer 119, which is formed by lubricant, on the protection layer 117. As the lubricant layer 119 has influence on the friction and the abrasion properties of the magnetic disk 110, it is important to keep the lubrication layer 119 in good conditions for maintaining the reliability of the magnetic disk drive 100.

In the near future, still lower spacing between the magnetic head 120 and the surface of the magnetic disk 110 will be required for high-density recording. Thus, it is really important to keep the surface of the magnetic disk 110 with a low coefficient of friction, a high resistance to abrasion and water repellency over a longer period of time.

However, the inside of the magnetic disk drive 100 reaches a high temperature. Furthermore, the magnetic disk 110 rotates at high speed in the drive 100. Even under the most benign ambient conditions, the interior of the disk drive 100 is a high-temperature environment due to the high rate of rotation of the disk 110 relative to the head 120. Increasing the rate of rotation of the disk 110 increases the centrifugal force that acts on any element of the lubrication layer 119; increasing the temperature of the disk 110 also increases the mobility of the elements of the lubrication layer 119. Elements of the lubrication layer 119 thus tend to move towards the circumference of the disk 110 over time, where they are more likely to be spun off the disk 110, so that the lubrication layer 119 tends to become thinner as the service time of the disk increases. A thinning lubrication layer 119 loses the capability of fulfilling its several roles. In order to prevent the lubrication layer 119 from losing the capability, the lubrication layer 119 should be formed by lubricant having strong adsorptive property to the surface (the protection layer 117) of the magnetic disk 110.

Concerning the lubrication layer 119 on the protection layer 117, it is considered that the lubrication layer 119 consists of a "bonding sub-layer" 119a, which consists of molecules that bind strongly to the protection layer 117, and a "mobile sub-layer" 119b, which consists of molecules that bind weakly to the protection layer 117. The mobile sub-layer 119b tends to undergo spin off as a result of centrifugal force by the disk rotation. It is estimated as a main reason of the thinning of the lubrication layer 119 as described above that the mobile layer 119b tends to move to the circumferential part of the magnetic disk 110 and much mobile sub-layer 119b breaks away from the magnetic disk 110 in the end.

It is important to maintain the original thickness of the lubrication layer 119 as much as possible, even for the magnetic disk 110 that is used for a long period of time. Thinning of the lubrication layer 119 is associated with loss of the mobile sub-layer 119b. Minimizing the thinning of the lubrication layer is accomplished by maximizing the "bonding ratio" of the lubrication layer, which is the ratio of the bonding sub-layer 119a to the mobile sub-layer 119b.

Many prior arts disks attempted to increase the thickness of the bonding sub-layer 119a. In the prior arts, a lubricant is applied to the protection layer 117 of the magnetic disk 110, and ultraviolet rays curing treatment or heating treatment is implemented on the lubrication layer 119 (lubricant) for increasing the ratio of the bonding sub-layer 119a (the bonding ratio).

However, it is not enough for increasing the bonding ratio to implement the above treatment only one time.

SUMMARY OF THE INVENTION

Accordingly, it is a general object of the present invention is to provide a novel and useful method of manufacturing a magnetic recording medium in which the problems described above are eliminated. Another object of the present invention is to provide a magnetic medium manufactured by the method.

The above objects are accomplished by a method of manufacturing a magnetic recording medium including steps of: a) laminating an underlayer, a magnetic layer for recording, and a protection layer of amorphous carbon on a substrate of the magnetic recording medium in turn, and b)

repeating a process to the protection layer of amorphous carbon comprising an application process of applying a lubricant, a subsequent ultraviolet rays treatment process, and a subsequent washing process for removing the lubricant which is not connected to the protection layer of amorphous carbon plural times.

The process to the protection layer of amorphous carbon comprising the application process of applying the lubricant, the subsequent ultraviolet rays treatment process, and the subsequent washing process for removing the lubricant which is not connected to the protection layer of amorphous carbon is repeated plural times. Thus, it is possible to reduce the ratio of the mobile sub-layer and increase the ratio of the bonding sub-layer by repeating plural times one set of the above three processes.

That is, the combination power between a surface of the protection layer of amorphous carbon and the lubricant applied on the protection layer of amorphous carbon will be strengthened. On the other hand, the bonding sub-layer whose combination power with the protection layer of amorphous carbon is lower will be removed by the subsequent wash process. Under the above state, it is easy to combine the lubricant with the surface of the protection layer of amorphous carbon because the lubricant is applied again. It is possible to increase the bonding ratio by repeating the process.

It is possible to either keep respective conditions for the above respective processes the same and repeat the process or modify a condition. For instance, an irradiation time in the ultraviolet rays (UV) treatment process can be modified based on a forming state of the bonding sub-layer.

It is difficult to know exactly the ratio of the mobile sub-layer and the bonding sub-layer in the lubrication layer formed on the protection layer of amorphous carbon. Accordingly, in the present invention, the magnetic recording medium on which the lubrication layer is formed is washed well by designated solvent and the lubrication layer implemented the wash process is regarded as the mobile sub-layer. Therefore, in the present invention, the increase of the bonding ratio means increase the width of the lubrication layer implemented the wash process.

It is preferred that the lubricant in the method is a compound of the perfluoro-polyether with an end-group including piperonyl or hydroxyl group. The bonding ration can be increased precisely by applying the lubricant, which is a compound of the perfluoro-polyether with an end-group including piperonyl or hydroxyl group and implementing ultraviolet rays (UV) treatment process as a process to strengthen the combination with the protection layer of amorphous carbon.

As a liquid lubricant which is a compound that is a perfluoro-polyether with an end-group including piperonyl group, FOMBLIN AM2001 available from Ausimont corp and others, more preferably FOMBLIN AM3001, is applicable to be used. As a liquid lubricant which is a compound that's a perfluoro-polyether with an end-group including hydroxyl group, FOMBLIN Zdo12000 available from Ausimont corp and others, more preferably FOMBLIN AMZdo14000, is applicable to be used.

The above objects are also accomplished by a method of manufacturing a magnetic recording medium including the steps of: a) laminating an underlayer, a magnetic layer for recording, and a protection layer of amorphous carbon on a substrate of the magnetic recording medium in turn, and b) repeating a process to the protection layer of amorphous carbon comprising an application process of applying a lubricant, an subsequent heat treatment process, and a subsequent washing process for removing the lubricant which is not connected to the protection layer of amorphous carbon plural times.

It is possible to either keep respective conditions for the above respective processes the same and repeat the process or modify a condition. For instance, a temperature of heating in the heat treatment process can be modified based on a forming state of the bonding sub-layer.

It is preferred that the lubricant in the above-described method is a compound of the perfluoro-polyether with an end-group including hydroxyl group.

The bonding ration can be increased by applying the lubricant which is a compound of the perfluoro-polyether with an end-group including hydroxyl group and implementing the heat treatment process as a process to strengthen the combination with the protection layer of amorphous carbon.

Furthermore, the above objects are also accomplished by a method of manufacturing a magnetic recording medium including the steps of: a) laminating an underlayer, a magnetic layer for recording, and a protection layer of amorphous carbon on a substrate of the magnetic recording medium in turn, and b) repeating a process to the protection layer of amorphous carbon comprising an application process of applying a lubricant, and a subsequent ultraviolet rays treatment process plural times.

It is preferred that the lubricant in the method is a compound of the perfluoro-polyether with an end-group including piperonyl or hydroxyl group.

Furthermore, the above objects are also accomplished by a method of manufacturing a magnetic recording medium including the steps of: a) laminating an underlayer, a magnetic layer for recording, and a protection layer of amorphous carbon on a substrate of the magnetic recording medium in turn, and b) repeating a process to the protection layer of amorphous carbon comprising an application process of applying a lubricant, and a subsequent heat treatment process plural times.

It is preferred that the lubricant in the method is a compound of the perfluoro-polyether with an end-group including hydroxyl group.

Other objects in the present invention are to provide a magnetic recording medium having a lubricant layer comprising a bonding sub-layer on a surface of the magnetic recording medium and manufactured by a process including the steps of a) laminating an underlayer, a magnetic layer for recording, and a protection layer of amorphous carbon on a substrate of the magnetic recording medium in turn, and, b) repeating plural times a process to the protection layer of amorphous carbon comprising an application process of applying a lubricant which is a compound of the perfluoro-polyether with an end-group including piperonyl or hydroxyl group, and a subsequent ultraviolet rays treatment process, or b) repeating plural times a progress to the protection layer of amorphous carbon comprising an application process of applying a lubricant which is a compound of the perfluoro-polyether with an end-group including piperonyl or hydroxyl group, a subsequent ultraviolet rays treatment process, and a further subsequent washing process for removing the lubricant which is not connected to the protection layer of amorphous carbon.

Still other objects in the present invention are to provide a magnetic recording medium having a lubricant layer including a bonding sub-layer on a surface of the magnetic recording medium and manufactured by a process including the steps of a) laminating an underlayer, a magnetic layer for recording, and a protection layer of amorphous carbon on a substrate of the magnetic recording medium in turn, and, b) repeating plural times a process to the protection layer of amorphous carbon comprising an application process of applying a lubricant which is a compound of the perfluoro-polyether with an end-group including hydroxyl group, and a subsequent heat treatment process, or b) repeating plural times a process to the protection layer of amorphous carbon comprising an application process of applying a lubricant which is a compound of the perfluoro-polyether with an end-group including hydroxyl group, a heat treatment process, and a further subsequent washing process for removing the lubricant which is not connected to the protection layer of amorphous carbon.

Other objects and further of the present invention will be apparent from the following detailed description when read in conjunction with the accompanying drawings.

DETAILED DESCRIPTION OF THE PREFERRED EMBODIMENTS

A description will be described, with reference to FIGS. 2 through 6, of principles and embodiments of the present invention.

At first, a first embodiment of the present invention will be described. It is the first embodiment of the present invention to repeat plural times one set process of an application process of applying a lubricant, an ultraviolet rays (UV) treatment process, and a washing process to a protection layer of amorphous carbon on a magnetic recording medium.

Figure 2:
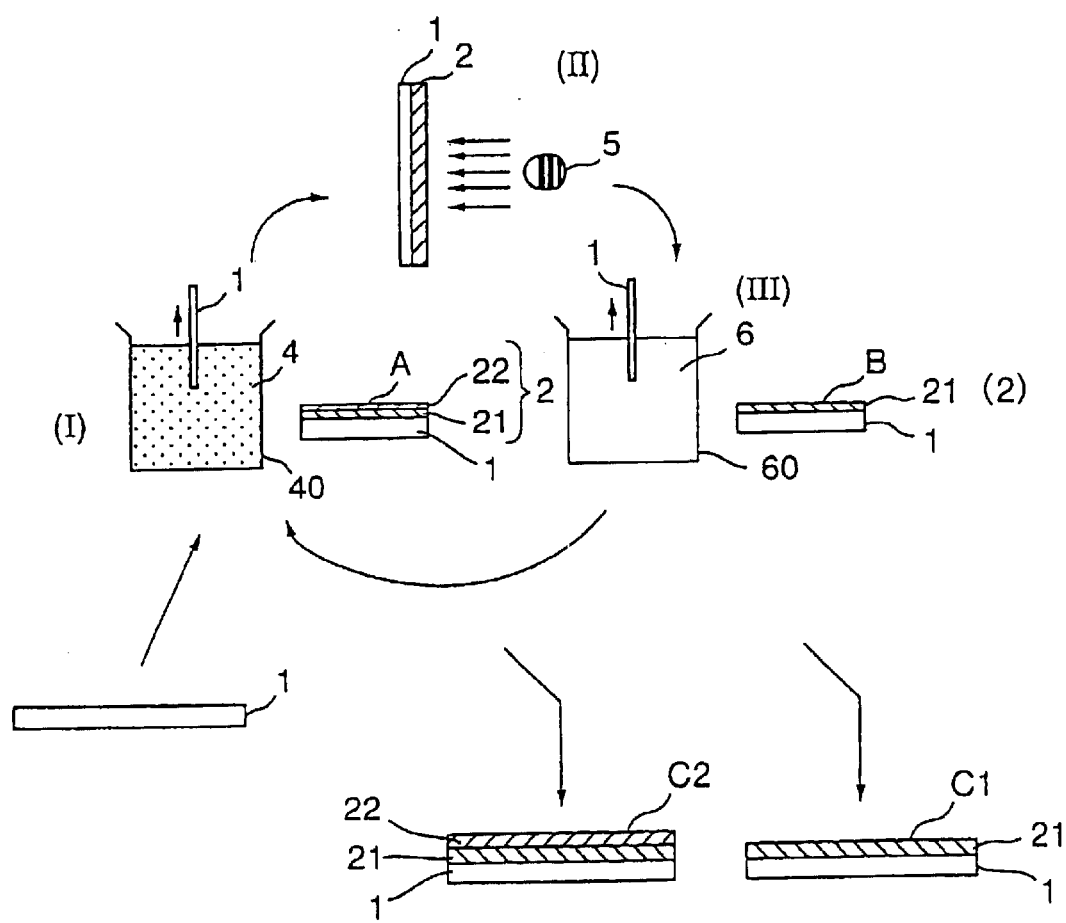
FIG. 2 is a diagram showing a step of an application process of applying a lubricant, an ultraviolet rays (UV) treatment process, and a washing process to the magnetic recording medium according to a first embodiment of the present invention.

FIG. 2 is a diagram showing a step of the to application process of applying a lubricant, an ultraviolet rays (UV) treatment process, and a washing process to the magnetic recording medium.

Figure 1:
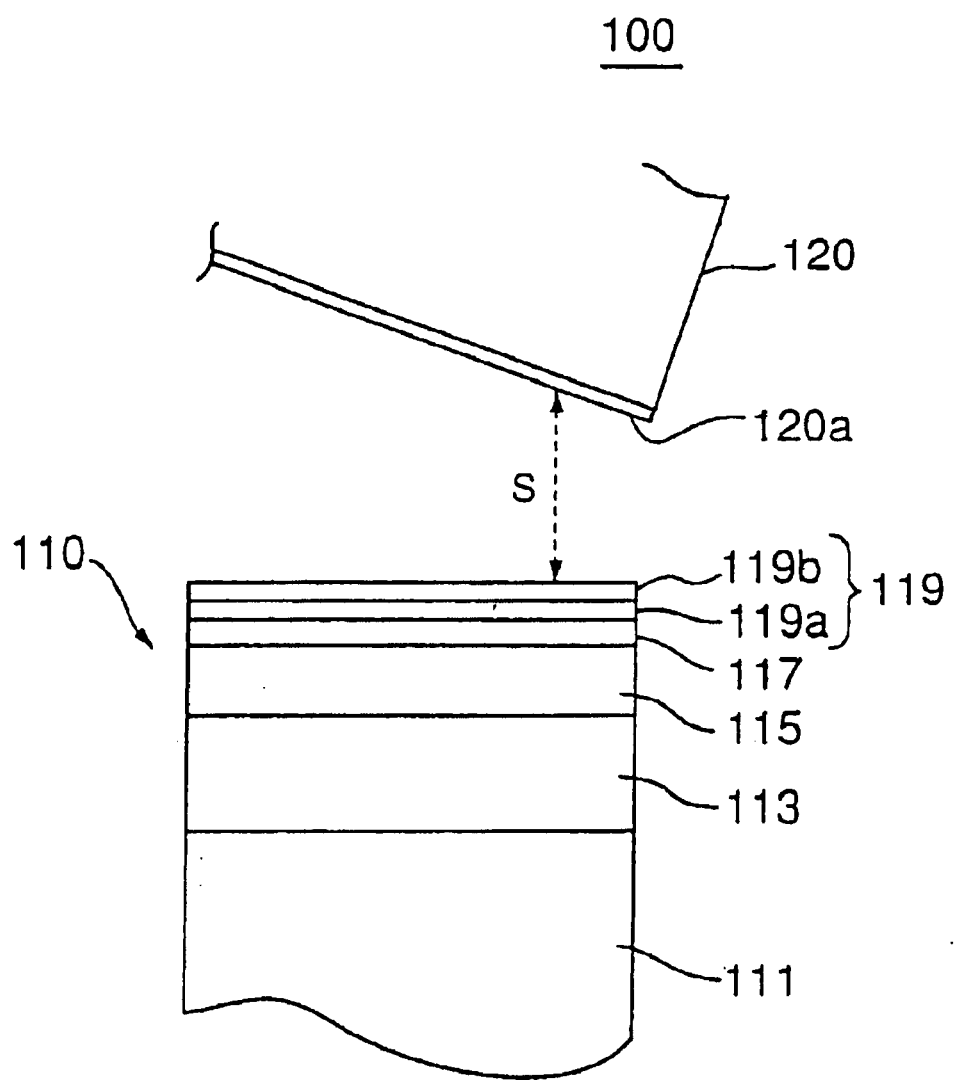
FIG. 1 is a schematic diagram showing a relationship between a magnetic head and a rotating magnetic disk in the magnetic disk drive of the present invention.

In the first embodiment of the present invention, a magnetic recording medium 1 manufactured by the prior art is prepared in advance. The magnetic recording medium 1 3 has a multilayered structure including a substrate, an underlayer formed on the substrate, and a magnetic layer formed on the underlayer. A protection layer of amorphous carbon is provided on the magnetic layer. The above-mentioned multilayered structure is the same as the prior arts shown in FIG. 1.

As FIG. 2 shows, in the present invention, at first the magnetic recording medium 1 is immersed in a bath of a liquid lubricant 4 filled in a container 40 and an application process (I) is implemented by a dip method for example. By the above process, the liquid lubricant 4 is applied on the protection layer of amorphous carbon which is a highest layer of the magnetic recording medium 1, so that a desirable lubrication layer 2 is formed.

The liquid lubricant 4 is preferably a compound that is a perfluoro-polyether with an end-group including piperonyl group. The lubricant 4 may be a compound such as FOMBLIN AM3001 available from Ausimont corp. The liquid lubricant 4 is prepared by diluting the FOMBLIN AM3001 to roughly 0.05 wt % in fluorocarbon solvent such as FLORINATE FC-77 of Sumitomo 3M corp. The application process (I) by the dip method is implemented for 30 seconds as a dipped time and pulling the magnetic recording medium 1 from the bath at 2.3 mm per second for instance. The useful dipping method may not be limited, a known method such as spin-coating method and wiping method are available too.

Next, as FIG. 2 shows, a ultraviolet rays (UV) treatment process (II) is implemented to the lubrication layer 2 formed on the magnetic recording medium 1. By this process, it is possible to strengthen a combination power between the lubrication layer 2 and the protection layer of amorphous carbon. That is, it is possible to accelerate a change from a mobile sub-layer to a bonding sub-layer in the lubrication layer 2 and increase a bonding ratio.

In the ultraviolet rays (UV) treatment process (II), the UV wavelength of about 200 nm and under is irradiated to the lubrication layer 2, and the duration may be set to roughly 60 seconds. It is possible to combine two or more kinds of ultraviolet rays, whose wavelengths are about 254 nm and 185 nm for instance.

In FIG. 2. A shown in the light side of the container 40 roughly schematically shows a construction of the lubrication layer 2 on the magnetic recording medium 1. Thus, there are a lot of mobile sub-layers 22 whose combination power is weak, as well as the bonding sub-layer 21 strongly combining with the protection layer of amorphous carbon in the lubrication layer 2 formed on the magnetic recording medium 1, after the application process of applying the lubricant 4 but before the ultraviolet rays (UV) treatment process. It is possible to change from the mobile sub-layers to the bonding sub-layer by implementing the ultraviolet rays (UV) treatment process to the lubrication layer 2. However, the mobile sub-layer is still contained in the lubrication layer after an ultraviolet rays (UV) treatment process.

In order to solve the above state, a wash treatment (III) is implemented by immersing the magnetic recording medium 1 in a bath of a solvent 6 for washing filled in a container 60, in the present embodiment. The mobile sub-layer 22 whose combination power with the protection layer of amorphous carbon is weak will be removed from the surface of the magnetic recording medium 1 by the wash process. Accordingly, it is possible to manufacture the magnetic recording medium 1 formed on its surface by the lubrication layer 2 comprised of only the bonding sub-layer 21 substantially, as B in the light side of the container 60 in FIG. 2 roughly schematically shows.

The fluorocarbon solvent that is the same as for diluting the above lubricant can be used as the solvent 6 for washing in this embodiment. The useful fluorocarbon solvent may not be limited, and other solvent is available as long as it can remove the mobile sub-layer 22 from the surface of the magnetic recording medium 1. The wash process (III) is implemented for 30 seconds as a dipped time and by pulling the magnetic recording medium 1 from the bath at 2.3 mm per second for instance.

Furthermore, it can be accelerated to remove the mobile sub-layer 22 from the surface of the magnetic recording medium 1 if the temperature of solvent 6 for washing is roughly less than the boiling point (at about 25 centigrade in case of FLORINATE FC-77), and if the magnetic recording medium 1 is washed by an ultrasonic generator in the wash process (III).

In the present embodiment, one set process of an application process of applying the lubricant (I), the ultraviolet rays (UV) treatment process (II), and the washing process (III) is repeated plural times. It is possible that the magnetic recording medium 1 has a designated width and to manufacture the magnetic recording medium 1 formed on its surface by a lubrication layer 2 (C1) comprised of only the bonding sub-layer 21 substantially, because the above process is repeated plural times. In case that the above process is repeated plural times, for instance five times, a lubrication layer 2 (C2) may be manufactured by omitting the last process, for instance the five times wash process (III). It is possible to either keep respective conditions for the above respective processes same and repeat the process or modify a condition. For instance, an irradiation time in the ultraviolet rays (UV) treatment process (II) can be modified based on a forming state of the bonding sub-layer.

Figure 3:
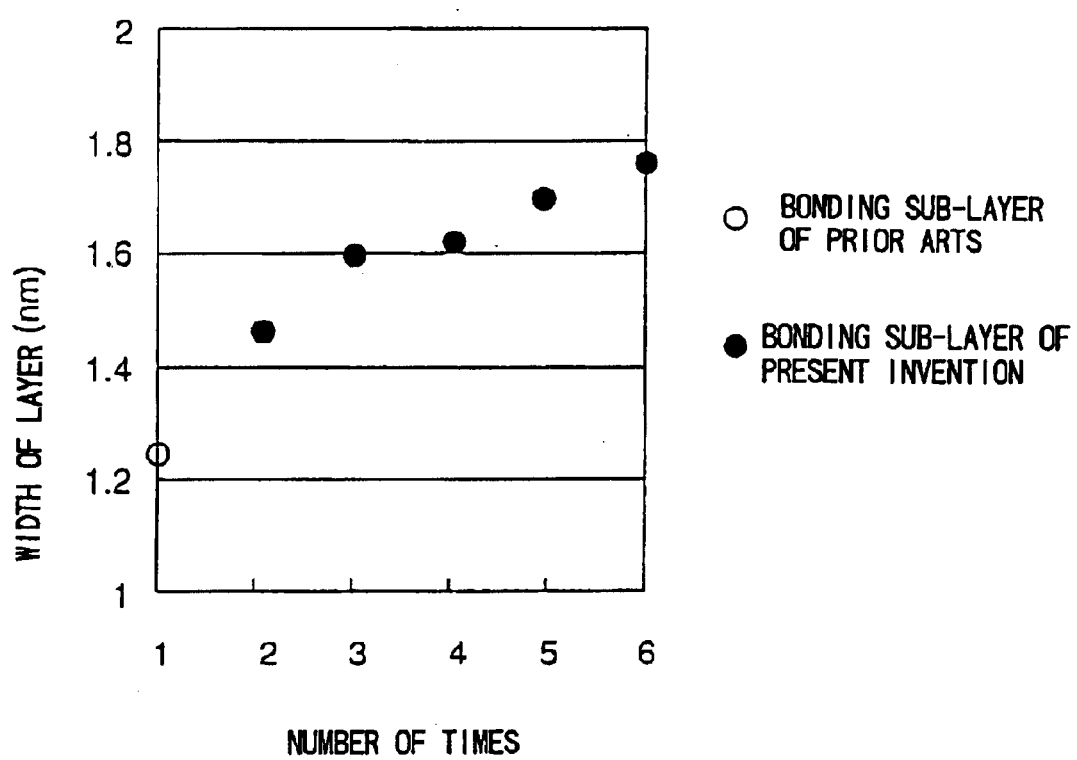
FIG. 3 is a view showing a state that the bonding sub-layer is increasing by repeating one set process of an application process of applying a lubricant, an ultraviolet rays (UV) treatment process, and a washing process plural times.

FIG. 3 is a view showing a state that the bonding sub-layer is increasing by repeating one set process of an application process of applying a lubricant (I), an ultraviolet rays (UV) treatment process (II), and a washing process (III) plural times. FIG. 3 shows widths of lubricant layer (widths of the bonding sub-layer substantially) measured after the surface of the magnetic recording medium is washed by the solvent for washing. The wash process is implemented for 30 seconds as a dipped time and pulling the magnetic recording medium 1 from the bath of fluorocarbon solvent at 2.3 mm per second for instance.

In FIG. 3 a white circle shows a case in which the application process and the ultraviolet rays (UV) treatment process are implemented one time according to prior art. The width of the lubricant layer in this case is about 1.25 nm.

The respective black circles show widths according to the present invention. That is, they show respective cases of that one set process of the application process of applying the lubricant (I), the ultraviolet rays (UV) treatment process (II), and the washing process (III), repeated 2–6 times. The respective black circles clearly show that the more the number of repeating the one set process increases, the more the width of the lubricant layer increases, about from 1.45 nm to 1.75 nm.

Accordingly, according to the present invention, it is possible to manufacture the magnetic recording medium having a desired width of the lubrication layer comprised of only the bonding sub-layer substantially by selecting the number of times for repeating the one set process of the application process of applying the lubricant (I), the ultraviolet rays (UV) treatment process (II), and the washing process (III).

A similar effect as the above can be taken in the case where the liquid lubricant 4 that is a perfluoro-polyether with an end-group including hydroxyl group is used in the first embodiment of the present invention. In this case, the lubricant 4 may be a compound such as FOMBLIN Zdo14000 available from Ausimont corp. The liquid lubricant 4 is prepared by diluting the FOMBLIN Zdo14000 to roughly 0.05 wt % in fluorocarbon solvent such as FLORINATE FC-77 of Sumitomo 3M corp.

Next, a second embodiment of the present invention will be explained based on FIGS. 4 and 5. The second embodiment of the present invention repeats plural times one set process of an application process of applying a lubricant, a heat treatment process, and a washing process to a protection layer of amorphous carbon on a magnetic recording medium. As contrasted with the first embodiment in which the ultraviolet rays (UV) treatment process is implemented, the heat treatment process is implemented in the second embodiment.

Figure 4:
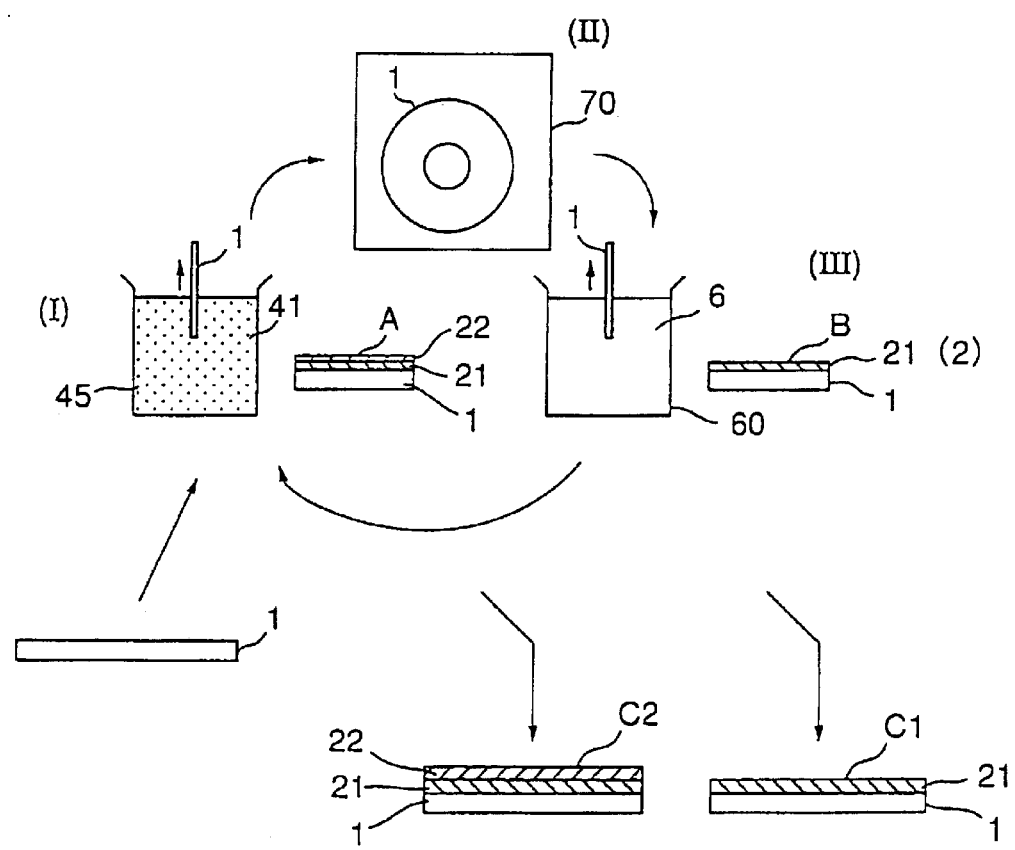
FIG. 4 is a diagram showing a step of the application process of applying a lubricant, a heat treatment process, and a washing process to the magnetic recording medium.

FIG. 4 is a diagram showing a step of the application process of applying a lubricant, a heat treatment process, and a washing process to the magnetic recording medium. The same reference characters are applied to like parts corresponding to the process in FIG. 2 showing the first embodiment.

In the second embodiment of the present invention, a magnetic recording medium 1 manufactured by the prior art is prepared in advance as in the first embodiment. The magnetic recording medium 1 has a multilayered structure including a substrate, an underlayer formed on the substrate, and a magnetic layer formed on the underlayer. The protection layer of amorphous carbon is provided on the magnetic layer.

In the second embodiment of the present invention, at first the magnetic recording medium 1 is immersed in a bath of a liquid lubricant 41 filled in a container 45 and an application process (I) is implemented by a dip method for example.

The liquid lubricant 41 is preferably a compound that is a perfluoro-polyether with an end-group including hydroxyl group. The lubricant 41 may be a compound such as FOMBLIN Zdo14000 available from Ausimont corp. The liquid lubricant 41 is prepared by diluting the FOMBLIN Zdo14000 to roughly 0.05 wt % in fluorocarbon solvent such as FLORINATE FC-77 of Sumitomo 3M corp.

The application process (I) by the dip method is implemented for 30 seconds as a dipped time, and by pulling the magnetic recording medium 1 from the bath at 2.3 mm per second, for instance. The useful dipping method may not be limited, as known methods such as spin-coating method and wiping method are available too.

Next, as FIG. 4 shows, a heat treatment process (II) is implemented to the lubrication layer 2 formed on the magnetic recording medium 1. By this process, it is possible to strengthen a combination power between the lubrication layer 2 and the protection layer of amorphous carbon. That is, it is possible to accelerate a change from a mobile sub-layer to a bonding sub-layer in the lubrication layer 2 and increase the bonding ratio.

A constant temperature container 70 is used in the heat treatment process (II). The temperature inside of the constant temperature container 70 keeps at 100–120 centigrade. The magnetic recording medium 1 on which the lubrication layer 2 is formed is heated by keeping for about thirty minutes in the constant temperature container 70 in the second embodiment.

A wash treatment (III) is implemented by immersing the magnetic recording medium 1 in a bath of a solvent 6 for washing filled in a container 60. The conditions for the wash treatment in the present embodiment are the same as in the first embodiment. It is possible to manufacture the magnetic recording medium 1 formed on its surface by the lubrication layer 2 comprised of only the bonding sub-layer 21 substantially according to the present embodiment.

In the present embodiment, one set process of an application process of applying the lubricant (I), the heat process (II), and the washing process (III) is repeated plural times. It is possible that the magnetic recording medium 1 has designated width and to manufacture the magnetic recording medium 1 formed on its surface by a lubrication layer 2 (C1) comprised of only the bonding sub-layer 21 substantially, because the above process is repeated plural times. In case that the above process is repeated plural times, for instance five times, a lubrication layer 2 (C2) may be manufactured by omitting the last process, for instance the five times wash process (III). It is possible to either keep respective conditions for the above respective process same and repeat the processes or modify a condition, a temperature for heat process (II) for instance, based on a forming state of the bonding sub-layer.

Figure 5:
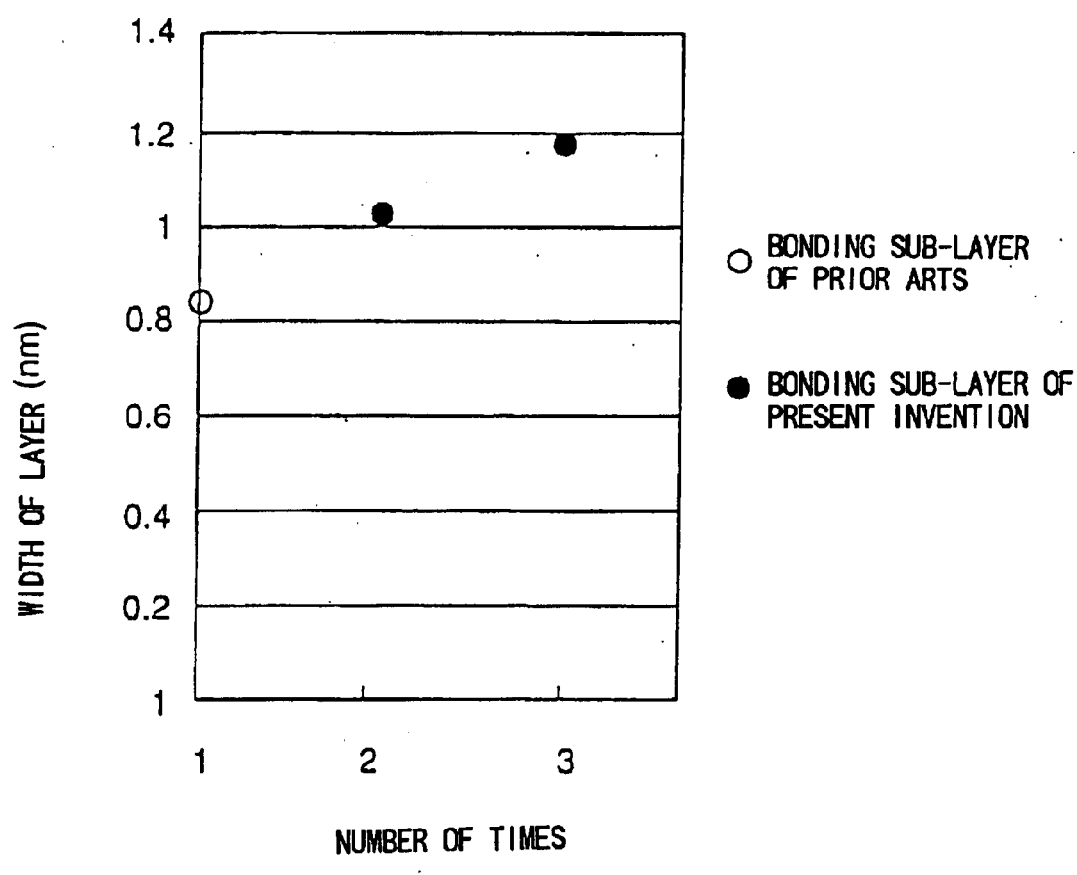
FIG. 5 is a view showing a state that the bonding sub-layer is increasing by repeating one set process of an application process of applying a lubricant, a heat treatment process, and a washing process, plural times.

FIG. 5 is a view showing a state that the bonding sub-layer is increasing by repeating one set process of an application process of applying a lubricant (I), the heat treatment process (II), and a washing process (III) plural times. FIG. 5 shows widths of lubricant layer (widths of the bonding sub-layer substantially) measured after the surface of the magnetic recording medium is washed by the solvent for washing as well as in FIG. 3.

In FIG. 5 a white circle shows a case in which the application process and the heat treatment process are implemented one time according to prior art. The width of lubricant layer in this case is about 0.85 nm.

The respective black circles show widths formed by a process of the present invention. That is, they show respective cases of the one set process of the application process of applying the lubricant (I), the ultraviolet rays (UV) treatment process (II), and the washing process (III) being repeated 2 or 3 times. The respective black circles clearly show that the more the number of times repeating the one set process increases, the more the width of the lubricant layer increases about from 1.05 nm to 1.15 nm. That is, the more the number of repetitions the one set process increases, the more the width of the lubricant layer increases.

Further, other embodiments of the present invention will be explained based on FIG. 6.

Undermentioned embodiments are cases to manufacture the magnetic recording medium without implementing the wash treatment (III) implemented in the first and second embodiments.

That is, one embodiment is to repeat plural times one set process of an application process of applying a lubricant and an ultraviolet rays (UV) treatment process, and the other one is to repeat plural times one set process of an application process of applying a lubricant and a heat treatment process.

In the case of repeating plural times one set process of an application process of applying a lubricant and an ultraviolet rays (UV) treatment process, the wash treatment process (III) as in the first embodiment of the present invention is not implemented and the magnetic recording medium 1 is manufactured with the same conditions as ones in the first embodiment. Therefore, an explanation based on a figure showing process steps is omitted.

In the case of repeating plural times one set process of application process of applying a lubricant and a heat treatment process, the wash treatment process (III) as in the second embodiment of the present invention is not implemented and the magnetic recording medium 1 is manufactured with the same conditions as ones in the second embodiment. Therefore, an explanation based on a figure showing process steps is omitted.

Inventors of the present invention confirmed that it is possible to increase the width of the bonding sub-layer by repeating one set process of the application process of applying the lubricant (I) and the ultraviolet rays (UV) treatment process or heat process (II) plural times without washing process (III).

FIG. 6 is a view showing a state that the bonding sub-layer is increasing by the present embodiment which omits the wash treatment process.

Figure 6A:
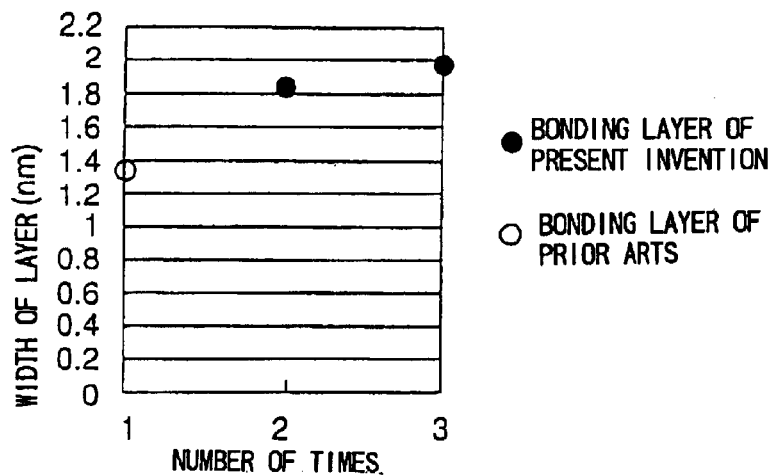
FIG. 6A is a view showing a state that the bonding sub-layer is increasing by repeating one set process of an application process of applying a lubricant (I) and an ultraviolet rays (UV) treatment process (II) with a compound of the perfluoro-polyether with an end-group including piperonyl group as the lubricant.
Figure 6B:
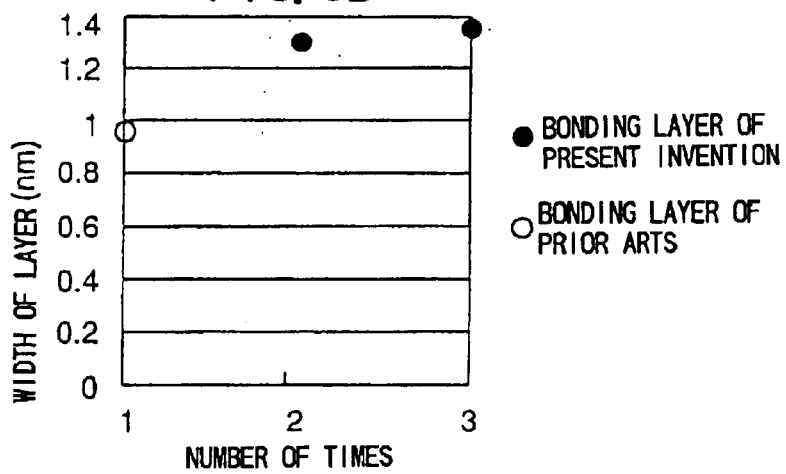
FIG. 6B is a view showing a state that the bonding sub-layer is increasing by repeating one set process of an application process of applying a lubricant (I) and an ultraviolet rays (UV) treatment process (II) with a compound of the perfluoro-polyether with an end-group including hydroxyl group as the lubricant.

More particularly, FIG. 6A is a view showing a state that the bonding sub-layer is increasing by repeating one set process of an application process of applying a lubricant (I) and an ultraviolet rays (UV) treatment process (II) with a compound of the perfluoro-polyether with an end-group including piperonyl group as the lubricant; FIG. 6B is a view showing a state that the bonding sub-layer is increasing by repeating one set process of an application process of applying a lubricant (I) and an ultraviolet rays (UV) treatment process (II) with a compound of the perfluoro-polyether with an end-group including hydroxyl group as the lubricant; and FIG. 6C is a view showing a state that the bonding sub-layer is increasing by repeating one set process of an application process of applying a lubricant (I) and a heat treatment process (II) with a compound of the perfluoro-polyether with an end-group including hydroxyl group as the lubricant.

Figure 6C:
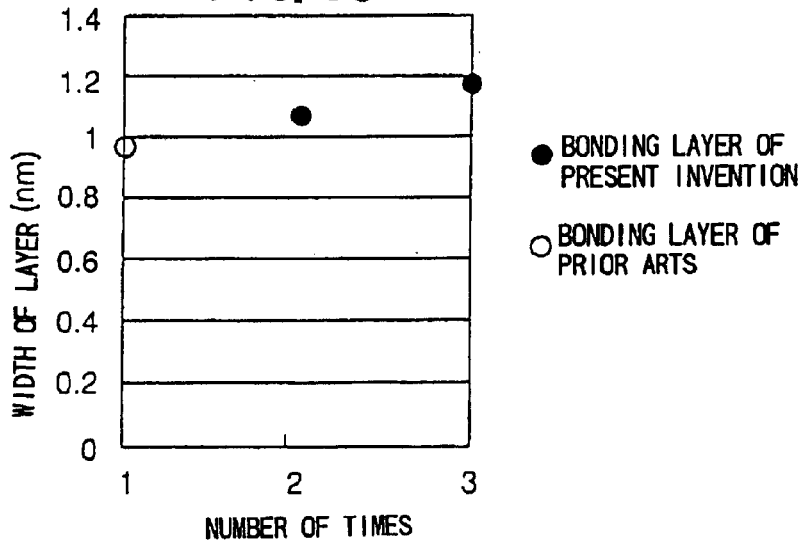
FIG. 6C is a view showing a state that the bonding sub-layer is increasing by repeating one set process of an application process of applying a lubricant (I) and a heat treatment process (II) with a compound of the perfluoro-polyether with an end-group including hydroxyl group as the lubricant.

FIGS. 6A, 6B, and 6C show widths of lubricant layer (widths of the bonding sub-layer substantially) measured after the surface of the magnetic recording medium is washed by the solvent for washing.

In FIG. 6A a white circle shows a case in which the application process and the ultraviolet rays (UV) treatment process are implemented one time according to the prior arts. The width of the lubricant layer in this case is about 1.3 nm.

The respective black circles show widths according to the present invention. That is, they show respective cases of the one set process of the application process of applying the lubricant (I) and the ultraviolet rays (UV) treatment process (II) being repeated 2 or 3 times. The respective black circles clearly show that the more the number of times repeating the one set process increases, the more the width of the lubricant layer increases, about from 1.85 nm to 1.95 nm.

In FIG. 6B a white circle shows a case in which the application process and an ultraviolet rays (UV) treatment process are implemented one time according to the prior arts. The width of the lubricant layer in this case is about 0.95 nm.

The respective black circles show widths according to the present invention. That is, they show respective cases of the one set process of the application process of applying the lubricant (I) and the ultraviolet rays (UV) treatment process (II) being repeated 2 or 3 times. The respective black circles clearly show that the more the number of times repeating the one set process increases, the more the width of the lubricant layer increases, about from 1.3 nm to 1.35 nm.

In FIG. 6C a white circle shows a case in which the application process and the heat treatment process are implemented one time according to the prior arts. The width of the lubricant layer in this case is about 0.95 nm.

The respective black circles show widths according to the present invention. That is, they show respective cases of the one set process of the application process of applying the lubricant (I) and the heat treatment process (II) being repeated 2 or 3 times. The respective black circles clearly show that the more the number of times repeating the one set process increases, the more the width of the lubricant layer increases, about from 1.1 nm to 1.2 nm.

Therefore, it is possible to manufacture the magnetic recording medium 1 forming the lubrication layer with high ratios of the bonding sub-layer on the protection layer of amorphous carbon by repeating one set of application process of applying the lubricant and the ultraviolet rays (UV) treatment process or heat process.

In the meantime, there are states to use the compound of the perfluoro-polyether with an end-group including piperonyl or hydroxyl group as the lubricant, to implement the ultraviolet rays (UV) treatment process or heat process in order to increase ratios of the bonding sub-layer on the protection layer of amorphous carbon, to select the number of repeating the one set of the process if necessary, and to take or omit the wash treatment process, in the present invention. Accordingly, the width of the lubrication layer formed on the magnetic recording medium manufactured by the present invention is not constant.

However, as FIGS. 3, 5, 6A, 6B, and 6C mentioning the widths of the lubricant layer (widths of the bonding sub-layer substantially) measured after the surface of the magnetic recording medium is washed by the solvent for washing clearly show, it is possible to manufacture the magnetic recording medium forming the lubrication layer substantially comprised of at least 1 nm or more widths of the bonding sub-layer on the protection layer of amorphous carbon, according to the present invention.

The present invention is not limited to these embodiments, but various variation and modifications may be made without departing from the scope of the present invention.

It is possible to manufacture the magnetic recording medium forming the lubrication layer substantially comprised of at least 1 nm or more widths of the bonding sub-layer on the protection layer of amorphous carbon, according to the present invention. Furthermore, it is possible to make a desired width by properly selecting the number of times the treatment process is repeated.

Therefore, as compared with the lubricant layer of the magnetic recording medium in the prior art, the lubrication layer can be maintained under a state of a low coefficient of friction for a long period of time, because the width of the magnetic recording medium according to the present invention is thick and the reduction of the width of the lubrication layer is very little with time progress.

What is claimed is:

1. A method of manufacturing a magnetic recording medium comprising the steps of:

a) laminating an underlayer, a magnetic layer for recording, and a protection layer of amorphous carbon on a substrate of said magnetic recording medium in turn; and b) repeating a process to said protection layer of amorphous carbon plural times, said process comprising an application process of applying a lubricant to said protection layer, a subsequent ultraviolet rays treatment process which connects a portion of said lubricant to said protection layer while leaving a portion which is not connected to said protection layer, and a subsequent washing process which removes said lubricant which is not connected to said protection layer by immersing the magnetic recording medium in a solvent.

2. The method as claimed in claim 1, wherein said lubricant is a compound of the perfluoro-polyether with an end-group including piperonyl or hydroxyl group.

3. The method as claimed in claim 1 wherein said repeating a process to said protection layer of amorphous carbon plural times increases a ratio of a thickness of said portion of said lubricant connected to said protection layer to a thickness of a portion of said lubricant weakly connected to said protection layer.

4. A method of manufacturing a magnetic recording medium comprising the steps of:

a) laminating an underlayer, a magnetic layer for recording, and a protection layer of amorphous carbon on a substrate of said magnetic recording medium in turn; and b) repeating a process to said protection layer of amorphous carbon plural times, said process comprising an application process of applying a lubricant to said protection layer, and a subsequent ultraviolet rays treatment process which connects a portion of said lubricant to said protection layer.

5. The method as claimed in claim 4, wherein said lubricant is a compound of the perfluoro-polyether with an end-group including piperonyl or hydroxyl group.

6. The method as claimed in claim 4 wherein said repeating a process to said protection layer of amorphous carbon plural times increases a ratio of a thickness of said portion of said lubricant connected to said protection layer to a thickness of a portion of said lubricant weakly connected to said protection layer.

* * * * *

UNITED STATES PATENT AND TRADEMARK OFFICE
CERTIFICATE OF CORRECTION

PATENT NO. : 6,890,585 B2
DATED : May 10, 2005
INVENTOR(S) : Yuichiro Itai et al.

It is certified that error appears in the above-identified patent and that said Letters Patent is hereby corrected as shown below:

<u>Title page,</u>
Item [63], Related U.S. Application Data, delete "PCT/JP94/03363" and insert -- PCT/JP99/03363 --.

Signed and Sealed this

Twelfth Day of July, 2005

JON W. DUDAS
*Director of the United States Patent and Trademark Office*